(12) United States Patent
Kang

(10) Patent No.: US 12,436,848 B2
(45) Date of Patent: Oct. 7, 2025

(54) MEMORY DEVICE AND OPERATION METHOD FOR GENERATING CHECK POINTS BASED ON WRITE DATA PATTERN

(71) Applicant: SK hynix Inc., Icheon-si (KR)

(72) Inventor: Hye Mi Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/668,589

(22) Filed: May 20, 2024

(65) Prior Publication Data

US 2025/0199917 A1     Jun. 19, 2025

(30) Foreign Application Priority Data

Dec. 19, 2023   (KR) .................. 10-2023-0185748

(51) Int. Cl.
*G06F 11/00* (2006.01)
*G06F 11/10* (2006.01)
*G06F 11/14* (2006.01)

(52) U.S. Cl.
CPC ...... *G06F 11/1469* (2013.01); *G06F 11/1016* (2013.01); *G06F 11/1407* (2013.01)

(58) Field of Classification Search
CPC ............ G06F 11/1469; G06F 11/1016; G06F 11/1407
See application file for complete search history.

(56) References Cited

U.S. PATENT DOCUMENTS

| 6,988,165 | B2 * | 1/2006 | White | G06F 12/0804 |
| | | | | 711/E12.04 |
| 2014/0095437 | A1 * | 4/2014 | Hwang | G06F 11/1469 |
| | | | | 707/634 |
| 2023/0376228 | A1 * | 11/2023 | Cariello | G06F 3/0655 |

FOREIGN PATENT DOCUMENTS

| KR | 10-2023-0139153 A | 10/2023 |
| KR | 10-2024-0058637 A | 5/2024 |

* cited by examiner

*Primary Examiner* — Jason B Bryan

(57) ABSTRACT

A memory system includes a memory device and a controller. The memory device includes a plurality of memory blocks. The controller recognizes a change in a pattern of a plurality of write data, delays a checkpoint operation associated with a write operation regarding the plurality of write data entries when operational data regarding the plurality of write data entries is within a range that is capable of being stored in a buffer, and performs the checkpoint operation when the operational data is beyond the range.

20 Claims, 9 Drawing Sheets

MEMORY DEVICE AND OPERATION METHOD FOR GENERATING CHECK POINTS BASED ON WRITE DATA PATTERN

CROSS-REFERENCE TO RELATED APPLICATIONS

This patent application claims the benefit of priority under 35 U.S.C. § 119 to Korean Patent Application No. 10-2023-0185748 filed on Dec. 19, 2023, the entire disclosures of which are incorporated herein by reference.

TECHNICAL FIELD

One or more embodiments of the present disclosure described herein relate to a memory system, and an operation method thereof, and more particularly, to an apparatus and a method for generating a check point based on a write data pattern.

BACKGROUND

A data processing system includes a memory system or a data storage device. The data processing system can be developed to store more voluminous data in the data storage device, store data in the data storage device faster, and read data stored in the data storage device faster. The memory system or the data storage device can include non-volatile memory cells and/or volatile memory cells for storing data.

The memory system may generate checkpoint data during a data input/output operation. The memory system may terminate its operation abnormally due to a sudden power off (SPO). In this case, when power is supplied or resumed, the memory system could be restored to an operating state before the sudden power off (SPO) based on the checkpoint data.

BRIEF DESCRIPTION OF THE DRAWINGS

The description herein makes reference to the accompanying drawings wherein like reference numerals refer to like parts throughout the figures.

DETAILED DESCRIPTION

Figure 1:
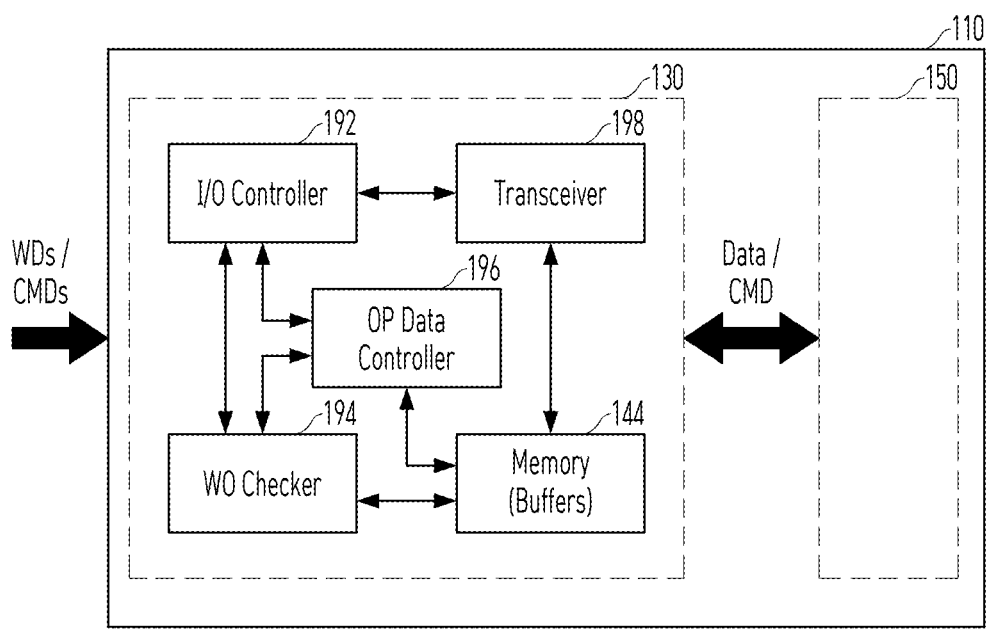
FIG. 1 illustrates a memory system according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits. According to an embodiment, the data entry may include a discrete object. According to another embodiment, the data entry may include a unit of information processed or handled for a data input/output operation. According to another embodiment, the data entry may include a unit of information within a transmission packet between two different components.

An embodiment in the disclosure can provide a memory system including a memory device, a data processing system including the memory system, and an operation process or a method, which may quickly and reliably process data into a memory device by reducing operational complexity and performance degradation of the memory system, thereby enhancing usage efficiency of the memory device.

An embodiment of the disclosure can provide an apparatus or a method for improving data input/output performance of the memory system by delaying, based on a pattern of a plurality of write data entries, a map data update operation or a check point operation.

In addition, an embodiment of the present invention can provide an apparatus or a method for avoiding or reducing an issue such as buffer overflow or overrun that might be occurred during a recovery operation, even when there is a size difference between a first buffer used for a data input or output operation and a second buffer used for a sudden power off recovery (SPOR) performed when power is supplied after a sudden power off (SPO). In the embodiment, an operation for storing operational data regarding a plurality of write data entries before the sudden power off (SPO) can be performed based on a size of the second buffer.

An embodiment of the present invention can provide a memory system, including a memory device comprising a plurality of memory blocks and a controller configured to recognize that a pattern of a plurality of write data entries changes, delay a checkpoint operation associated with a write operation regarding the plurality of write data entries when operational data regarding the plurality of write data entries is within a range that is capable of being stored in a buffer, and perform the checkpoint operation when the operational data is beyond the range. The checkpoint operation can include an operation for adding, into log data, operational data regarding at least one write entry, which has been stored in the memory device, among the plurality of write data entries.

The pattern can be changed from sequential data entries to a random data entry.

The operational data can include information regarding a logical address and a physical address associated with the random data entry.

The operational data can include count information on how many the sequential data entries have been stored in the memory device.

The range can be determined based on a size of the buffer established for a recovery operation performed after a sudden power off (SPO), a size of map data regarding sequential data entries present before the sudden power off, and a size of map data used for the recovery operation.

In the memory system, a first number of maximum sequential data entries and a second number of maximum random data entries, which are programmed in the memory device during continuous write operations, are determined based on a size of the buffer. The first number can be greater than the second number.

The controller can be further configured to: store checkpoint information in log data through the checkpoint operation; and restore the plurality of write data entries based on the checkpoint information when power is supplied after a sudden power off (SPO).

The controller can be configured to, after the power is supplied, add operational data corresponding to a random data entry to map data of sequential data entries when it is recognized through the checkpoint information that the pattern changed.

The controller can be configured to record the random data entry as a first entry of new sequential data entries in a spare region of the map data, based on the operation data corresponding to the random data entry.

The controller can be configured to skip data scan for an open memory block based on count information regarding sequential data entries, which is included in the checkpoint information.

Another embodiment of the present invention can provide a method for operating a memory system, including recognizing a change in a pattern of a plurality of write data entries input from an external device; determining whether operational data regarding the plurality of write data entries, programmed in a memory device comprising a plurality of memory blocks, is within a range that is capable of being stored in a buffer; delaying a checkpoint operation associated with a write operation regarding the plurality of write data entries when the operational data is within the range; and performing the checkpoint operation when the operational data is beyond the range.

The checkpoint operation can include an operation for adding, into log data, operational data regarding at least one write entry, which has been stored in the memory device, among the plurality of write data entries.

The pattern can be changed from sequential data entries to a random data entry.

The operational data can include information regarding a logical address and a physical address associated with the random data entry and count information on how many the sequential data entries have been stored in the memory device.

The range can be determined based on a size of the buffer established for a recovery operation performed after a sudden power off (SPO), a size of map data regarding sequential data entries present before the sudden power off, and a size of map data used for the recovery operation. A first number of maximum sequential data entries and a second number of maximum random data entries, which are programmed in the memory device during continuous write operations, can be determined based on a size of the buffer. The first number can be greater than the second number.

The method can further include storing checkpoint information in log data through the checkpoint operation; and restoring the plurality of write data entries based on the checkpoint information when power is supplied after a sudden power off (SPO).

The restoring the plurality of write data entries can include adding, after the power is supplied, operational data corresponding to a random data entry to map data of sequential data entries when it is recognized through the checkpoint information that the pattern changed.

The adding the operational data can include recording the random data entry as a first entry of new sequential data entries in a spare region of the map data, based on the operation data corresponding to the random data entry.

The restoring the plurality of write data entries can include skipping data scan for an open memory block based on count information regarding sequential data entries, which is included in the checkpoint information.

Embodiments will now be described with reference to the accompanying drawings, wherein like numbers reference like elements.

FIG. 1 illustrates a memory system according to an embodiment of the present disclosure.

Referring to FIG. 1, a memory system 110 can include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The memory device 150 can include a plurality of memory blocks. The memory block may be understood as a group of non-volatile memory cells from which data is removed together by a single erase operation. The memory block may include a plurality of pages. According to an embodiment, each page may be understood as a group of non-volatile memory cells that store data together during a single program operation or output data together during a single read operation.

The memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data input to, or output from, non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange a data entry and a signal with the controller 130.

According to an embodiment, the memory device 150 may include at least one memory block, at least one memory plane, or at least one memory die. The internal configuration of the memory device 150 shown in FIG. 1 may be different according to performance of the memory system 110. An embodiment of the disclosure is not limited to the internal configuration shown in FIG. 1.

In order to store a write data entry requested by an external device (see, e.g., host 102 in FIGS. 8-9) in the memory device 150 (e.g., a storage space including non-volatile memory cells), the memory system 110 may perform address translation between a file system used by the host 102 with a physical location of the storage space including the non-volatile memory cells. For example, a data address determined according to the file system used by the host 102 may be called a logical address or a logical block address, while an address for the physical location at which a data entry is stored in the storage space may be referred as to a physical address or a physical block address. When the host 102 transfers a logical address to the memory system 110 together with a read request or a read command, the memory system 110 searches for a physical address associated with the logical address, reads a data entry stored in a location recognized by the physical address, and outputs the read data entry to the host 102. During this procedure, address translation may be performed in the memory system 110 to search for the physical address associated with the logical address input from the host 102.

The controller 130 may perform a data input/output operation in response to a request or a command input from the external device. For example, when the controller 130 performs a read operation in response to a read request or a read command input from an external device, a data entry stored in a plurality of non-volatile memory cells included in the memory device 150 is transmitted to the controller 130. For the read operation, the input/output controller 192 may perform address translation to the logical address input from the external device to obtain a physical address, and then transmit a read command to the memory device 150 corresponding to the physical address through the transceiver 198. The transceiver 198 may transmit the read command to the memory device 150 and receive a data entry output from the memory device 150 corresponding to the physical address. The transceiver 198 may store a data entry transmitted from the memory device 150 in the memory 144. The input/output controller 192 may output a data entry stored in the memory 144 to the external device in response to the read request or the read command.

In addition, the input/output controller 192 may transmit a write data entry input along with a write request or a write command from the external device to the memory device 150 through the transceiver 198. After storing the data in the memory device 150, the input/output controller 192 may transmit a response corresponding to the write request or the write command to the external device. The I/O controller 192 may update map data that associates the physical address, which indicates a location where the write data entry in the memory device 150 is stored, with the logical address input along with the write request or the write command.

When the input/output controller 192 performs the data input/output operation, a write operation checker 194 may determine an operation pattern regarding write requests (or write commands) and a plurality of write data entries input from the external device. For example, the write operation checker 194 may determine whether a plurality of write requests transmitted by an external device are associated with sequential data entries or a random data entry. When the write operation checker 194 determines a pattern regarding operations performed in the memory system 110, the input/output controller 192 may schedule operations corresponding to a plurality of requests or commands received from an external device based on the pattern. For example, when mixed requests or commands for sequential data entries and a random data entry are input, the input/output controller 192 may classify or arrange each of the mixed requests or commands based on the pattern determined by the write operation checker 194, in order to adjust or change a sequence of operations performed corresponding to the mixed requests or commands. In one embodiment, when a plurality of requests or commands for sequential data entries and a random data entry are mixed, the input/output controller 192 may perform operations associated with at least some of the plurality of requests or commands regarding the sequential data entries earlier than an operation corresponding to another of the plurality of requests or commands regarding the random data entry, to improve data input/output performance of the memory system 110.

An operational data controller 196 can perform a checkpoint operation at a preset cycle or under a preset operating condition. Herein, the checkpoint operation may be used to ensure consistency and stability of data entries stored in the memory device 150. The checkpoint operation can save a current working or operating state to avoid or prevent data loss when an issue such as a system failure or crash occurs while performing a long-duration task such as continuous program operations for voluminous write data entries. For example, if the memory system 110 crashes while writing a specific data entry to the memory device 150, all operations done so far might be lost. To avoid this issue, the current operating state could be saved at certain time intervals or certain operating conditions by checkpoint operations. When checkpoint information is saved by the checkpoint operation, even if the memory system 110 goes down, only data entries after the last saved checkpoint needs to be reworked, greatly reducing data loss in the memory system 110.

The checkpoint operation can be used for maintaining data consistency. For example, in a situation where multiple memory blocks should be updated simultaneously, it is difficult to confirm that an update task completed until all the memory blocks have been updated.

In this case, the checkpoint operation can be used for setting checkpoints before and after the update for all the memory blocks. Even if an issue occurs after the checkpoints are set, the memory system can roll back to anyone of operational states corresponding to the checkpoints for maintaining data consistency in the memory system 110.

According to an embodiment, based on a pattern regarding a plurality of commands (CMDs) and a plurality of write data entries (WDs), which is recognized or determined by the write operation checker 194, the operational data controller 196 can determine whether to perform a checkpoint operation. Herein, the checkpoint operation may include an operation of updating map data regarding data entries which have been stored in the memory device 150. The checkpoint operation and the map data can be used to support data stability and consistency. The map data is a kind of information used for the controller 130 to track a physical location of a data entry stored in the memory device 150. Through the checkpoint operation performed at any point, the memory system 110 can store a state of data entries (or an operational state) in time. Checkpoint information generated and stored during the checkpoint operation can include map data which may indicate a physical location or a state of a data entry. Because the map data can be stored together at a time when the checkpoint information is generated is updated, data consistency could be maintained by a roll-back operation based on the checkpoint information even if the memory system 110 suddenly fails to operate. In addition, when a situation such as sudden power off occurs in the memory system 110, the memory system 110 can find a physical location of the data entry stored before the sudden power off, after restarting (i.e., after power is supplied), based on the map data stored through the checkpoint operation. The stored data entry could be restored or recovered, so that data loss could be avoided.

The map data may include a plurality of mapping entries regarding mapping information, each of which may associate a logical address with a physical address, or vice versa, which is used as operation information for a data input/output operation performed by the controller 130. For example, the I/O controller 192 may use a mapping entry for address translation, and mapping entries may be updated or generated after data corresponding to a write request or a write command is programmed in the memory device 150. According to an embodiment, the map data may be classified into first map data (e.g., Logical to Physical (L2P) table) for associating a logical address with a physical address and second map data (e.g., Physical to Logical (P2L) table) for associating a physical address with a logical address. The map data controller 196 may determine or change the data structure for the first map data or the second map data loaded or generated in the memory 144.

According to an embodiment, a mapping entry included in the first map data or the second map data stored in the memory device 150 may be stored to associate a single logical address with a single physical address. A plurality of mapping entries may constitute a single map segment. The map segment may be considered a unit of which map data stored in the memory device 150 is composed. After the controller 130 loads and stores at least some portion of the first map data or the second map data from the memory device 150 in the memory 144, the controller 130 may utilize the loaded information for data input/output operations. When there is sufficient space temporarily allocated for the first map data and the second map data in the memory 144, a process of changing a data structure or shape for the first map data or the second map data may cause unnecessary overhead. However, the storage capacity of the memory 144 in the memory system 110 may be limited. When the space allocated for temporarily storing the first map data and the second map data including a plurality of mapping entries is reduced, more space in the memory 144 may be allocated and used for other purposes such as data I/O operations.

According to an embodiment, the first map data (e.g., L2P table) including a plurality of first mapping entries (e.g., Logical to Physical (L2P) information) for associating a logical address with a physical address may be stored in the memory device 150. But, the controller 130 may generate second map data (P2L table) including a plurality of second mapping entries (e.g., Physical to Logical (P2L) information) generated through a plurality of data input/output operations for associating the physical address with the logical address.

For example, after the controller 130 programs a new piece of user data to the memory device 150, the controller 130 may generate a second mapping entry (P2L) for linking a physical address (which indicates the location where the new piece of user data is programmed) to a logical address input from the host 102 and corresponding to the new piece of user data. The second mapping entry P2L in the memory 144 may provide an indication of a recent location regarding data stored in the memory device 150. In one case, it may be assumed that a first mapping entry L2P indicates that a specific logical address (e.g., '0A0') and a first physical address (e.g., '123') are associated with each other in the first map data (L2P table) loaded in the memory 144.

After the controller 130 performs a subsequent program operation regarding new data corresponding the same logical address (e.g., '0A0'), the controller 130 may generate a second mapping entry (P2L) in the memory 144. The second mapping entry (P2L) may associate the logical address (e.g., '0A0') with a second physical address (e.g., '876'), indicating the location where the new data is stored by the program operation. In this case, the controller 130 may recognize that the first mapping entry L2P stored in the first map data (L2P table) is old and the second mapping entry P2L is the latest, i.e., most recent, mapping entry. The controller 130 can update the first map data (L2P table) stored in the memory device 150 based on the second mapping entry P2L.

As described above, the controller 130 may perform a map flush (e.g., an operation for updating the first map data (L2P table) stored in the memory device 150) periodically, intermittently, or as needed. After the map flush is performed, the second map data P2L table including the second mapping entry P2L in the memory 144 may be deleted or destroyed. When an operation for programming data in the memory device 150 is performed after the map flush is performed, the controller 130 may generate new second map data (P2L table).

The timing for performing a checkpoint operation including map data update may be determined differently according to embodiments. For example, when the controller 130 performs 10 program operations, the controller 130 may determine that the map data update (or map flush) should be performed. For example, when a space allocated for the second map data (P2L table) is full and a new second mapping entry P2L cannot be added in the space, the controller 130 may determine that the map data update should be performed. For example, according to an embodiment, the controller 130 may determine that the map data update is performed every predetermined period (e.g., 1 hour, 10 minutes, 1 minute, or etc.).

A checkpoint operation including the map data update is an operation that may be performed in the memory system 110, for example, when the memory system 110 has an independent address system (e.g., a physical address distinguishable from a logical address) that is not adopted by an external device such as the host 102. The external device does not have to request the map data update at the memory system 110. The memory system 110 performs the map data update independently, and as a result, data input/output operations may be delayed during the map data update. The map data update in the memory system 110 may be recognized as overhead from a perspective of the external device. Thus, when the map data update occurs too frequently, data input/output performance may deteriorate.

A size of the memory 144, which includes a buffer established for storing the checkpoint information and the map data, could be limited. According to an embodiment, performance of the checkpoint operation may be determined based on a buffer size limitation. A buffer set in the memory 144 is generally a space for temporarily storing data. When the space becomes full, the memory system 110 should move fulfilled data to the memory device 150, which is a non-volatile storage device. A cycle of the checkpoint operation could be determined based on a size of the buffer. If the cycle of the checkpoint operation is set too long, there might not be enough space in the buffer. This may increase the risk of data loss or, in severe cases, may cause performance degradation of the memory system 110. Conversely, if the cycle of the checkpoint operation is set too short, overheads may increase, which might negatively affect operating performance of the memory system 110. Accordingly, when the cycle of the checkpoint operation is appropriately adjusted according to the size of the buffer, a usage pattern of the buffer, and a requirement of the memory system 110, the performance of the memory system 110 could be optimized while ensuring data stability.

According to an embodiment, the checkpoint operation may store or add the checkpoint information in journaling data. The checkpoint operation and a journaling performed in the memory system 110 could be performed to ensure data consistency and stability. The journaling can involve first recording upcoming changes in a log called a 'journal' before changing a state or storing a data entry in the memory device 150. Afterwards, the data entry can be stored, or the state can be changed. If an error occurs in the memory system 110 during a process of changing or storing the data entry, the memory system 110 can be restored to the last completed consistent state based on the log recorded in the journal. The checkpointing operation and the journaling can have a complementary relationship and are mechanisms used to ensure the stability and consistency of data. The checkpoint operation can store an operating state of the memory system 110 at a specific time point, and the journaling can be used to safely perform changes without data loss by logging the changes.

Referring to FIG. 1, the operational data controller 196 may determine, based on the pattern of the commands (CMDs) or the write data entries (WDs) transmitted from an external device, when to perform a checkpoint operation. For example, when a plurality of commands transmitted from an external device are input having sequential data entries, unlike a case when a plurality of commands are input having random data entries, the operational data controller 196 can compress map data related to the sequential data entries. In this case, when the plurality of commands having the sequential data entries are input, a time at which the checkpoint operation is performed could be delayed, as compared to when the plurality of commands having random data entries are input. When the controller 130 can use more resources to process the plurality of commands with the sequential data entries, the data input/output performance of the memory system 110 could be improved.

Figure 2:
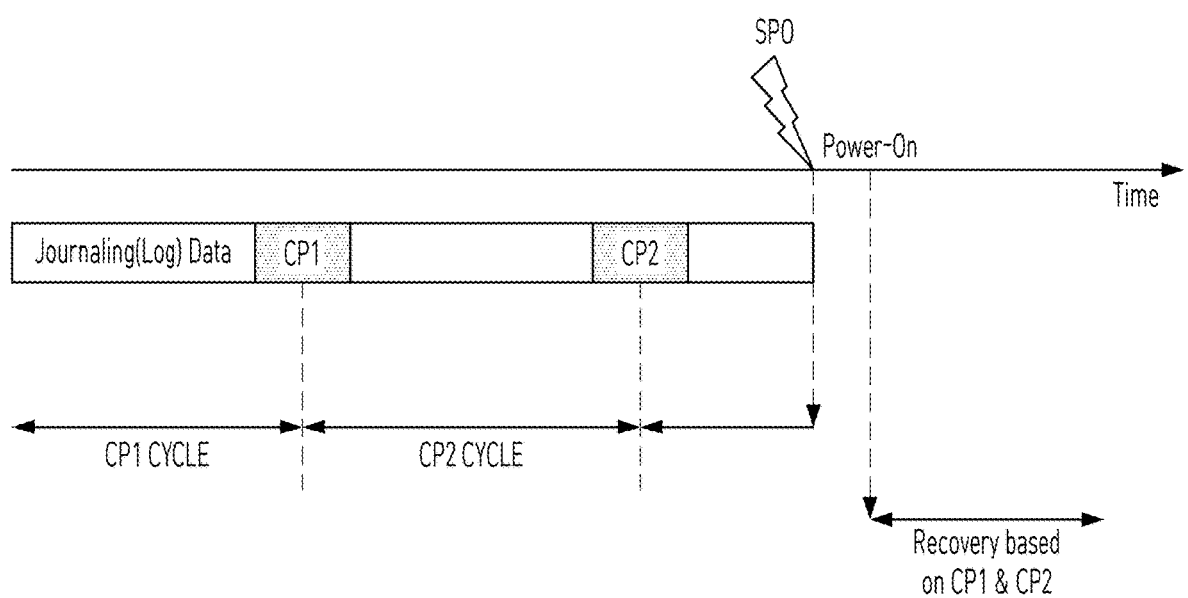
FIG. 2 illustrates a check point operation and a recovery operation according to an embodiment of the present disclosure.

FIG. 2 illustrates a check point operation and a recovery operation according to an embodiment of the present disclosure.

Referring to FIGS. 1 and 2, the memory system 110 may perform data input/output operations in response to a plurality of commands (CMDs) transmitted from an external device. The plurality of commands (CMDs) input from external devices may include write commands or program commands accompanied with write data entries (WDs). The operational data controller 196 can manage and store information associated with operations performed within the memory system 110. According to an embodiment, the memory system 110 may perform the checkpoint operation and the journaling. Examples of operational data generated thereby can include checkpoint information CP1 and CP2 and journaling data (e.g., Journaling (Log) Data).

As time passes, the memory system 110 can perform a plurality of various operations. During the plurality of various operations of the memory system 110, information necessary for data stability and consistency in the memory system 110 can be stored with the checkpoint information CP1 and CP2 in the journaling data (e.g., Journaling (Log) Data). Referring to FIG. 2, the memory system 110 can add the checkpoint information CP1 and CP2 to the journaling data. According to another embodiment, the memory system 110 can separately store the checkpoint information CP1 and CP2 and the journaling data in different areas.

The checkpoint information CP1 and CP2 can be generated based on a preset cycle of the checkpoint operations. That is, a first checkpoint cycle (CP1 CYCLE) in which the first checkpoint information (CP1) is generated and a second checkpoint cycle (CP2 CYCLE) in which the second checkpoint information (CP2) is generated can be substantially equal.

However, operations performed in the memory system 110 during checkpoint cycles may not be substantially equal regardless of the time of the checkpoint cycles being the same. For example, data input/output operations performed by the memory system 110 during the first checkpoint cycle (CP1 CYCLE) and the second checkpoint cycle (CP2 CYCLE) may be different. Although data entries of 10M bytes may be stored in the memory device 150 during the first checkpoint cycle (CP1 CYCLE), data entries of 5M bytes may be stored in the memory device 150 during the second checkpoint cycle (CP2 CYCLE). In some cases, although a significant amount of random data entries may be stored in the memory device 150 during the first checkpoint cycle (CP1 CYCLE), only sequential data entries may be stored in the memory device 150 (without random data entries) during the second checkpoint cycle (CP2 CYCLE). When operations performed in the memory system 110 during each checkpoint cycle may be different, an amount of operational data maintained and managed by the memory system 110 during each checkpoint cycle may be different. Accordingly, it may be more efficient for the memory system 110 to perform the checkpoint operation for generating the checkpoint information CP1 and CP2 if a preset operation condition is satisfied rather than at each preset cycle set for performing the checkpoint operation.

If a sudden power off (SPO) occurs while the memory system 110 is operating, the memory system 110 could no longer perform normal operations. In this case, the memory system 110 may use an auxiliary power source to store the checkpoint information CP1 and CP2 and the journaling data (e.g., Journaling (Log) Data) into non-volatile memory.

When power is supplied (Power-On) after the sudden power off (SPO), the memory system 110 can perform a recovery operation based on the checkpoint information CP1 and CP2. For example, the recovery operation may include updating map data for data entries which have been stored in the memory device 150 before sudden power off (SPO) occurs. Through the recovery operation, the memory system 110 can return to an operating state before the sudden power off (SPO) occurred (roll-back).

Figure 3:
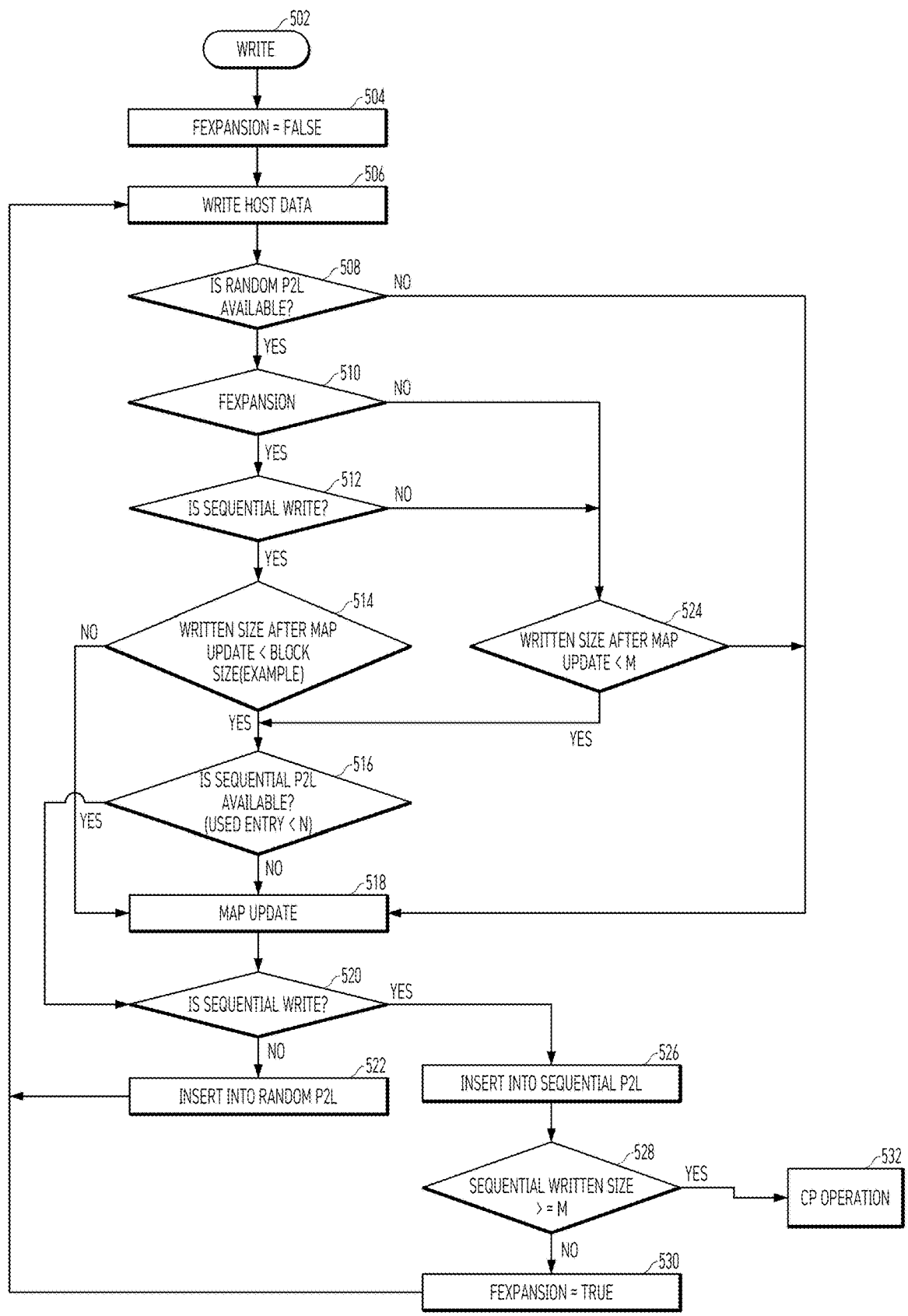
FIG. 3 illustrates an operation performed in a memory system according to another embodiment of the present disclosure.

FIG. 3 illustrates an operation performed in a memory system according to another embodiment of the present disclosure. Specifically, an operating method of the memory system can include an operation for determining when a map data update or a checkpoint operation is performed in a process of performing a plurality of program operations for storing a plurality of write data entries in the memory device 150.

Referring to FIG. 3, if there is a write data entry that is a target of a write operation to be performed within the memory device 150, the write operation may be started (step 502).

An indicator or a flag regarding whether the operational data is expanded (fExpansion) is set to "not expanded" (FALSE) (step 504). Here, whether the operational data is expanded indicates whether there is a data entry stored in the memory device 150 but for which map data associated with the stored data entry has not been updated.

For example, the memory device 150 may store first map data (L2P table) including a first mapping entry (Logical to Physical, L2P) for associating a logical address with a physical address. The controller 130 can generate second map data (P2L table) including a second map entry (Physical to Logical, P2L) for associating a physical address with a logical address during data input/output operations. The map data update (step 518) includes an operation of updating the first map data (L2P table) or the first mapping entry (L2P) based on the second map data (P2L table).

If the indicator or the flag regarding expansion of the operational data is set to "expanded" (TRUE), the indicator or the flag indicates that there is a data entry that requires a map data update. That is, this indicates that the second map data (P2L table) regarding the write data entry has been generated during the write operation, but the first map data (L2P table) has not yet been updated based on the second map data (P2L table).

Meanwhile, when the indicator or the flag regarding the expansion of the operation information is set to "not expanded" (FALSE), the indicator or the flag indicates that the first map data has been updated for the data entry stored in the memory device 150. That is, this indicates that the first mapping entry (L2P) in the first map data (L2P table) has been updated for the corresponding data entry stored in the memory device 150.

Because the first mapping entry (L2P) is stored in the memory device 150, the corresponding data entry could be maintained even if power is not supplied. However, the second map data (P2L table) is temporarily stored in the memory 144 and could disappear or be destroyed if power is not supplied. Restoring the second map data (P2L table) regarding data entries stored in the memory device 150 before the power was cut off based on the checkpoint information CP1 and CP2 and the journaling data (e.g., Journaling (Log) Data) is necessary for the memory system 110 to maintain data safety and consistency.

Afterwards, the write data entry is stored in the memory device 150 (step 506).

After storing the write data entry in the memory device 150 (step 506), the memory system 110 may check whether second map data (e.g., P2L table) regarding a random data entry is available (step 508). Herein, a second map table (e.g., Random P2L table) regarding random data entries can be available when the corresponding random data entry does not affect continuous write/program operations performed within the memory system 110. If the memory system 110 holds the continuous write/program operations due to the corresponding random data entry, the controller 130 can determine that the second map data (e.g., Random P2L table) regarding the random data entries would be not available. If the second map table (e.g., Random P2L table) regarding the random data entry is not available (NO in step 508), the memory system 110 updates the map data before performing a next program operation (step 518). According to an embodiment, the memory system 110 may perform a checkpoint operation along with updating the map data (step 518).

If the second map data (e.g., P2L table) regarding the random data entry is available (YES in step 508), the memory system 110 may determine whether the operational data can be expanded (step 510). If the operational data cannot be expanded (NO in step 510), the memory system 110 can update the map data corresponding to the write operation, which has been performed, to check whether a size of the map data is less than a first reference value (M) (step 524). Here, the first reference value (M) may determine a range restored or recovered by a recovery operation (e.g., sudden power off recovery (SPOR) operation) performed when power is supplied (Power-On) after sudden power-off (SPO). In a process of updating the map data, the memory system 110 may update the map data (step 518) before performing a next program operation if the size of the map data is not less than the first reference value (M) (NO in step 524).

If the operational data can be expanded (YES in step 510), the memory system 110 can check whether the write operation is for a sequential data entry (step 512). Here, checking whether the write data entry is a sequential data entry can include checking whether the write data entry is sequential with a previously programmed data entry. For example, a change in the pattern of write data entries can be confirmed based on checking whether the write data entry is sequential to data that has been previously programmed. If the write operation is not for a sequential data entry (NO in step 512), the memory system 110 can update the map data corresponding to the write operation to check whether a size of the map data is smaller than the first reference value (M) (524 step). Here, the first reference value (M) may be a restored range through a recovery operation (e.g., sudden power off recovery (SPOR) operation) performed when power is supplied (Power-On) after sudden power-off (SPO). When updating the map data, the memory system 110 can update the map data (step 518) before performing a next program operation if the size of the map data is not less than the first reference value (M) (NO in step 524).

If the write operation is for sequential data entries (YES in step 512), the memory system 110 may determine whether a size of data that can be programmed after updating the map data is less than a second reference value (step 514). According to an embodiment, the second reference value may correspond to an amount of data that can be stored in the memory device 150 using auxiliary power when sudden power off (SPO) occurs. When the sudden power off (SPO) occurs, the memory system 110 needs to perform a minimum operation to maintain data safety and consistency. In this situation, it may be difficult to store data entries in a plurality of open memory blocks within the memory device 150. Therefore, the second reference value may, for example, correspond to a size of one memory block allocated to be used during sudden power off (SPO) in the memory device 150.

If the size of data that can be programmed after updating the map data is not less than the second reference value (NO in step 514), the memory system 110 may update the map data (step 518) before performing a next program operation.

If the size of data that can be programmed after updating the map data is less than the second reference value (YES in step 514) or if the map data is less than the first reference size (M) when updating the map data (YES in step 524), the memory system 110 can check whether first map data (e.g., P2L table) of sequential data entries is available (step 516). At this time, the available map data (e.g., P2L) for sequential data entries may vary depending on a maximum number (N) of sequential data entries programmable in the memory system 110. The maximum number (N) of programmable sequential data entries may correspond to a cycle of checkpoint operations that the memory system 110 can perform as late as possible to maintain data safety and consistency. If the map data (e.g., P2L) of sequential data entries is not available (NO in step 516), the memory system 110 may update the map data (step 518) before performing the next program operation.

If the mapping entry (e.g., P2L) of sequential data entries is available (YES in step 516), the memory system 110 can check whether the write operation is for sequential data entries (step 520). Here, checking whether the corresponding write data entry is a sequential data entry can include checking whether it is a random or a sequential data entry based on a relationship with a previously programmed data entry. For example, it is possible to check whether the corresponding write data entry is a random data entry or a new sequential data entry. If the write operation is not for sequential data entries (NO in step 520), the memory system 110 may add a mapping entry corresponding to the write operation to map data for random data entries (e.g., Random P2L table) (step 522). If the write operation is for sequential data entries (YES in step 520), the memory system 110 may add the mapping entry corresponding to the write operation to the map data for sequential data entries (e.g., Sequential P2L table) (step 526).

After adding the mapping entry corresponding to the write operation to the map data for the sequential data entries (e.g., Sequential P2L table), the memory system 110 can check whether a size of the map data for the sequential data entries (e.g., Sequential P2L table) is greater than or equal to the first reference value (M) (step 528). If the size of the map data for the sequential data entries (e.g., Sequential P2L table) is greater than or equal to the first reference value (M) (YES in step 528), the memory system 110 may perform the checkpoint operation (step 532).

According to an embodiment, the checkpoint operation may include an operation for updating map data. For example, processes in performing the checkpoint operation (step 532) and performing a map data update (step 518) may include substantially a same operation.

If the size of the map data for the sequential data entries (e.g., Sequential P2L table) is not greater than the first reference value (M) (NO in step 528), the memory system 110 may change the indication or flag indicating whether the operational data is expanded (fExpansion) to "expanded" (TRUE) (Step 530). Afterwards, the memory system 110 may perform a program operation to store a next write data entry in the memory device 150 (step 506).

Figure 4:
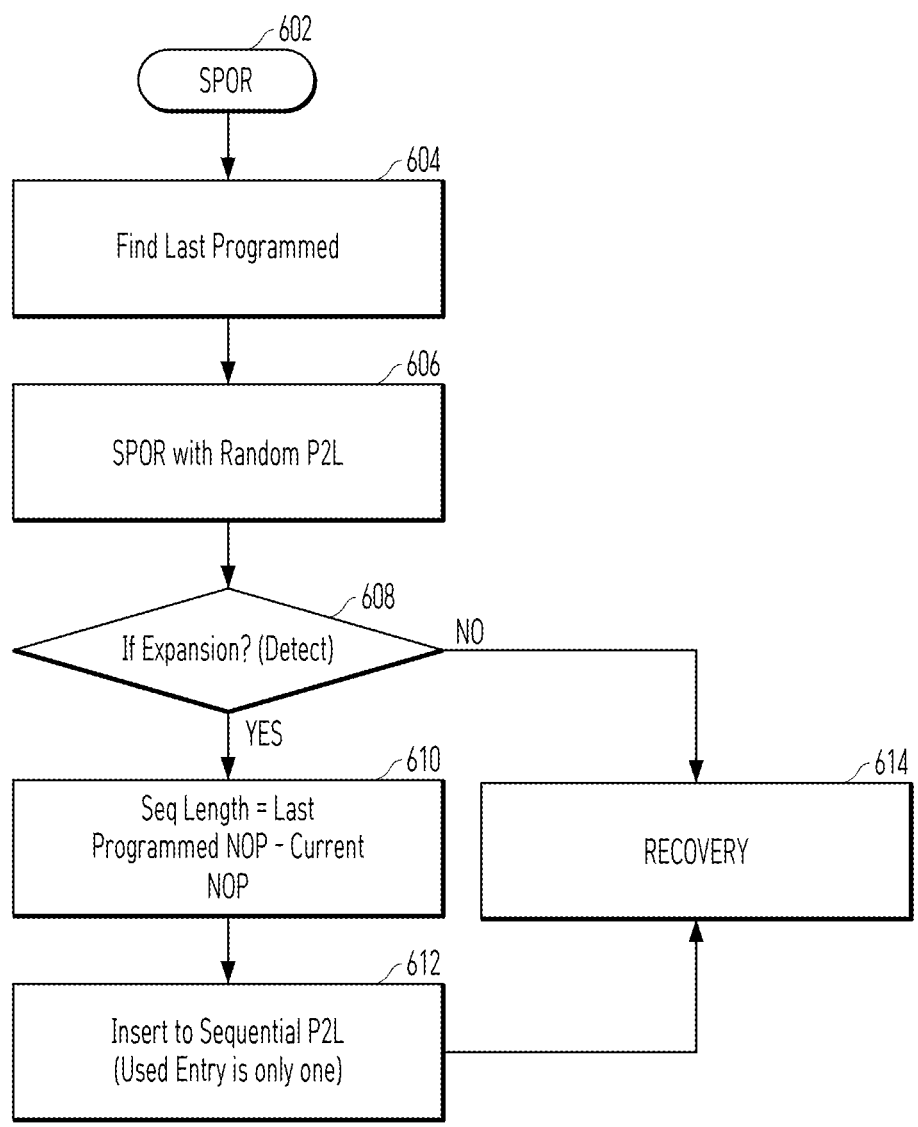
FIG. 4 illustrates a recovery operation performed in a memory system in accordance with another embodiment of the present disclosure.

FIG. 4 illustrates a recovery operation performed in the memory system in accordance with another embodiment of the present disclosure. FIG. 4 illustrates a recovery operation (e.g., a sudden power off recovery (SPOR) operation) when checkpoint information is stored according to an operating method of the memory system described in FIG. 3. The recovery operation (SPOR) can be performed when power is supplied (Power-On) after sudden power-off (SPO) (step 602).

Referring to FIG. 4, the memory system 110 may scan the last stored data in the memory device 150 (step 604). The memory system 110 can check the last stored data by scanning open memory blocks in the memory device 150 that were used before the sudden power off (SPO).

The memory system 110 then performs a recovery operation based on map data for random data entries (e.g., Random P2L table) (step 606). Typically, sequential data entries that the memory system 110 stores in the memory device 150 outnumber random data entries stored therein. Since each random data entry is not continuously connected to each other, each random data entry may be restored based on the map data (e.g., P2L table) for the random data entries.

The memory system 110 may then check, using checkpoint information stored in the memory device 150, whether the operational data is expanded (step 608). Referring to FIG. 3, if the operational data is indicated as being not expanded (FALSE) (NO in step 608), the memory system 110 does not have to restore map data (e.g., P2L table) for data entries stored in the memory device 150 (step 614). The memory system 110 can check the map data (e.g., P2L table) secured through the checkpoint information CP1 and CP2 and the journaling data (e.g., Journaling (Log) Data), and perform a restoration operation based on the corresponding map data (e.g., P2L table) (step 614).

When the operational data is indicated as being expanded (TRUE), it is necessary for the memory system 110 to restore the map data (e.g., P2L table) for the data entries stored in the memory device 150. First, the memory system 110 can calculate an area for sequential data entries from map data (e.g., P2L table) secured through the checkpoint information CP1 and CP2 and the journaling data. The memory system 110 can determine a length of the sequential data entries (Seq Length) based on a difference between a position of the last stored data (Last Programmed NOP) and a last position (Current NOP) of the map data (e.g., P2L table) (step 610).

The memory system 110 may insert data or information not recorded in the map data (e.g., P2L table) but stored in the memory device 150 into the map data (e.g., Sequential P2L table) for the sequential data entries (step 612). Thereafter, the memory system 110 may perform a recovery operation based on the map data (e.g., Sequential P2L table) for the updated sequential data entries (step 614).

Referring to FIGS. 3 and 4, the memory system 110 may continue to perform write operations while delaying a checkpoint operation or a map data update operation in response to a state of the buffer set for storing operational data even when a pattern of write data entries is changed. The state of the buffer set for storing the operational data may be determined based on a plurality of preset reference values corresponding to the performance of the memory system 110.

Figure 5:
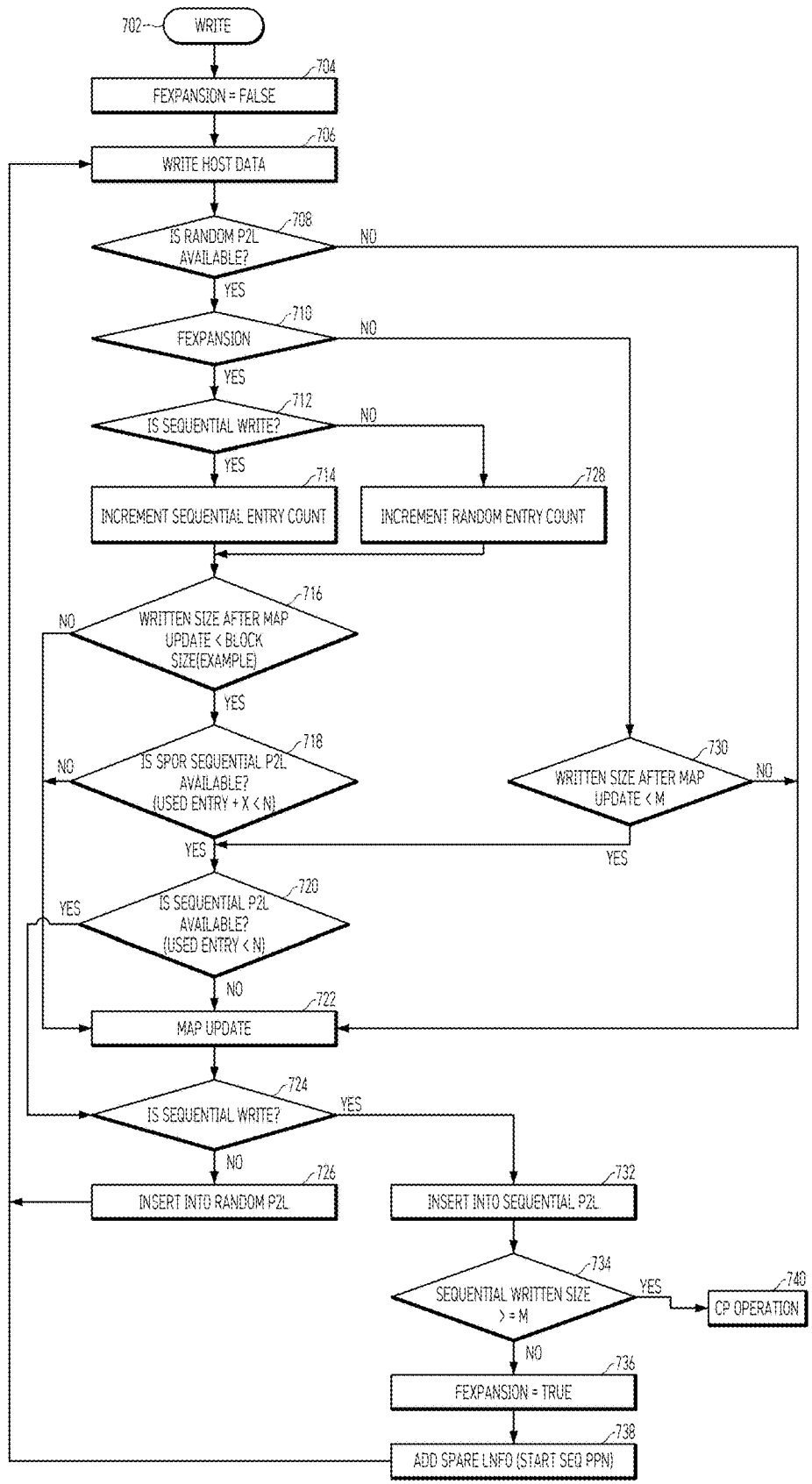
FIG. 5 illustrates an operation performed in a memory system according to another embodiment of the present disclosure.

FIG. 5 illustrates an operation performed in a memory system according to another embodiment of the present disclosure. Specifically, an operating method of the memory system can include an operation for determining when a map data update or a checkpoint operation is performed in a process of performing a plurality of program operations to store a plurality of write data entries in the memory device 150.

Referring to FIG. 5, if there is a write data entry that is the target of a write operation to be performed in the memory device 150, the write operation may be started (step 702).

First, an indicator (fExpansion) of whether the operational data is expanded is set to not expanded (FALSE) (step 704). Herein, whether the operational data is expanded is substantially equal to whether the operational data is expanded as described in FIG. 3.

Afterwards, the write data entry is stored in the memory device 150 (step 706).

After storing the write data entry in the memory device 150 (step 706), the memory system 110 can check whether map data (e.g., Random P2L table) for random data entries is available (step 708). If the map data (e.g., Random P2L table) for the random data entries is not available (NO in step 708), the memory system 110 updates the map data (e.g., L2P table) before performing a next program operation (step 722). According to an embodiment, the memory system 110 may perform the checkpoint operation along with updating the map data (e.g., L2P table) (step 722).

If the map data (e.g., Random P2L table) for the random data entries is available (YES in step 708), the memory system 110 can determine whether the operational data can be expanded (step 710). If the operational data cannot be expanded (NO in step 710), the memory system 110 can update the map data corresponding to the write operation to check whether a size of the map data is less than the preset size (M) (step 730). Herein, the first reference value (M) may be a range recovered or restored through a recovery operation (e.g., a sudden power off recovery (SPOR) operation) performed when power is supplied (Power-On) after sudden power-off (SPO). When updating the map data, the memory system 110 can update the map data (step 722) before performing a next program operation if the size of the map data is not less than the first reference value (M) (NO in step 730).

If the operational data can be expanded (YES in step 710), the memory system 110 can check whether the write operation is for a sequential data entry (step 712). Here, checking whether the write data entry is a sequential data entry can include checking whether the write data entry is sequential with a previously programmed data entry. For example, a change in the pattern of write data entries can be confirmed based on checking whether the write data entry is sequential data that has been previously programmed. If the write operation is not for a sequential data entry (NO in step 712), the write operation could be for a random data entry, so that the memory system 110 may increase a number (e.g., length) of the random data entries (728 step). If the write operation is for a sequential data entry (YES in step 712), the memory system 110 may increase a number of sequential data entries by '1' (step 714).

The memory system 110 may determine whether a size of data that can be programmed after updating the map data is less than a second reference value (step 716). According to an embodiment, the second reference value may correspond to an amount of data that can be stored in the memory device 150 using auxiliary power when sudden power off (SPO) occurs. When the sudden power off (SPO) occurs, the memory system 110 needs to perform a minimum operation to maintain data safety and consistency. In this situation, it may be difficult to store data entries in a plurality of open memory blocks within the memory device 150. Therefore, the second reference value may, for example, correspond to a size of one memory block allocated to be used during sudden power off (SPO) in the memory device 150.

If the size of data that can be programmed after updating the map data is not less than the second reference value (NO in step 716), the memory system 110 may update the map data (e.g., L2P table) (step 722) before performing a next program operation.

If the size of data that can be programmed after updating the map data is less than the second reference value (YES in step 716), the memory system 110 can check whether there is available map data (e.g., available space in the map data) used for the sudden power off recovery (SPOR) operation performed when power is supplied (power-on) after sudden power-off (SPO). For example, the memory system 110 can determine whether a value of adding a number of random data entries (from step 728) or an increment (e.g., '1') of sequential data entries to a number of data entries currently used (stored) in the map data for sequential data entries is less than a maximum number (N) of programmable sequential data entries. The maximum number (N) of programmable sequential data entries can correspond to a cycle of checkpoint operations that the memory system 110 can perform as late as possible to maintain the data safety and consistency. If there is no available space in the map data (NO in step 718), the memory system 110 can update the map data (e.g., L2P table) (step 722) before performing the next program operation.

If there is an available space in the map data (YES in step 718), or when updating the map data, the map data is less than the preset size (M) (YES in step 730), the memory system 110 can check whether the map data (e.g., Sequential P2L table) for the sequential data entries is available (step 720). At this time, availability of the map data (e.g., Sequential P2L table) for sequential data entries may vary depending on the maximum number (N) of sequential data entries programmable in the memory system 110. If the map data (e.g., Sequential P2L table) for sequential data entries is not available (NO in step 720), the memory system 110 can update the map data (e.g., L2P table) (step 722) before performing the next program operation.

If the mapping entry (e.g., Sequential P2L) of sequential data entries is available (YES in step 720), the memory system 110 can check whether the write operation is for sequential data entries (step 724). Here, checking whether the corresponding write data entry is a sequential data entry can include checking whether it is a random or a sequential data entry based on a relationship with a previously programmed data entry. For example, it is possible to check whether the corresponding write data entry is a random data entry or a new sequential data entry. If the write operation is not for sequential data entries (NO in step 724), the memory system 110 may add a mapping entry corresponding to the write operation to map data (e.g., Random P2L table) for random data entries (step 726). If the write operation is for sequential data entries (YES in step 724), the memory system 110 may add the mapping entry corresponding to the write operation to the map data (e.g., Sequential P2L table) for sequential data entries (step 732).

After adding the mapping entry corresponding to the write operation to the map data (e.g., Sequential P2L table) for the sequential data entries, the memory system 110 can check whether a size of the map data (e.g., Sequential P2L table) for the sequential data entries is greater than or equal to the first reference value (M) (step 734). If the size of the map data (e.g., Sequential P2L) for the sequential data entries is greater than or equal to the first reference value (M) (YES in step 734), the memory system 110 can perform the checkpoint operation (step 740).

According to an embodiment, the checkpoint operation may include an operation for updating map data. For example, respective processes for performing the checkpoint operation (step 740) and for performing a map data update (step 722) can include substantially a same operation.

If the map data (e.g., P2L table) for the sequential data entries is not greater than the first reference value (M) (NO in step 734), the memory system 110 may change the indication or flag indicating whether the operational data is expanded (fExpansion) to "expanded" (TRUE) (Step 736). The memory system can insert additional information into the map data (e.g., P2L table) for sequential data entries (step 738). For example, the memory system 110 can store a physical address of the corresponding data entry and another information of pointing to a start of new sequential data entries in a spare area of the map data (e.g., Sequential P2L table) for sequential data entries. Afterwards, the memory system 110 may perform a program operation to store a next write data entry in the memory device 150 (step 706).

Figure 6:
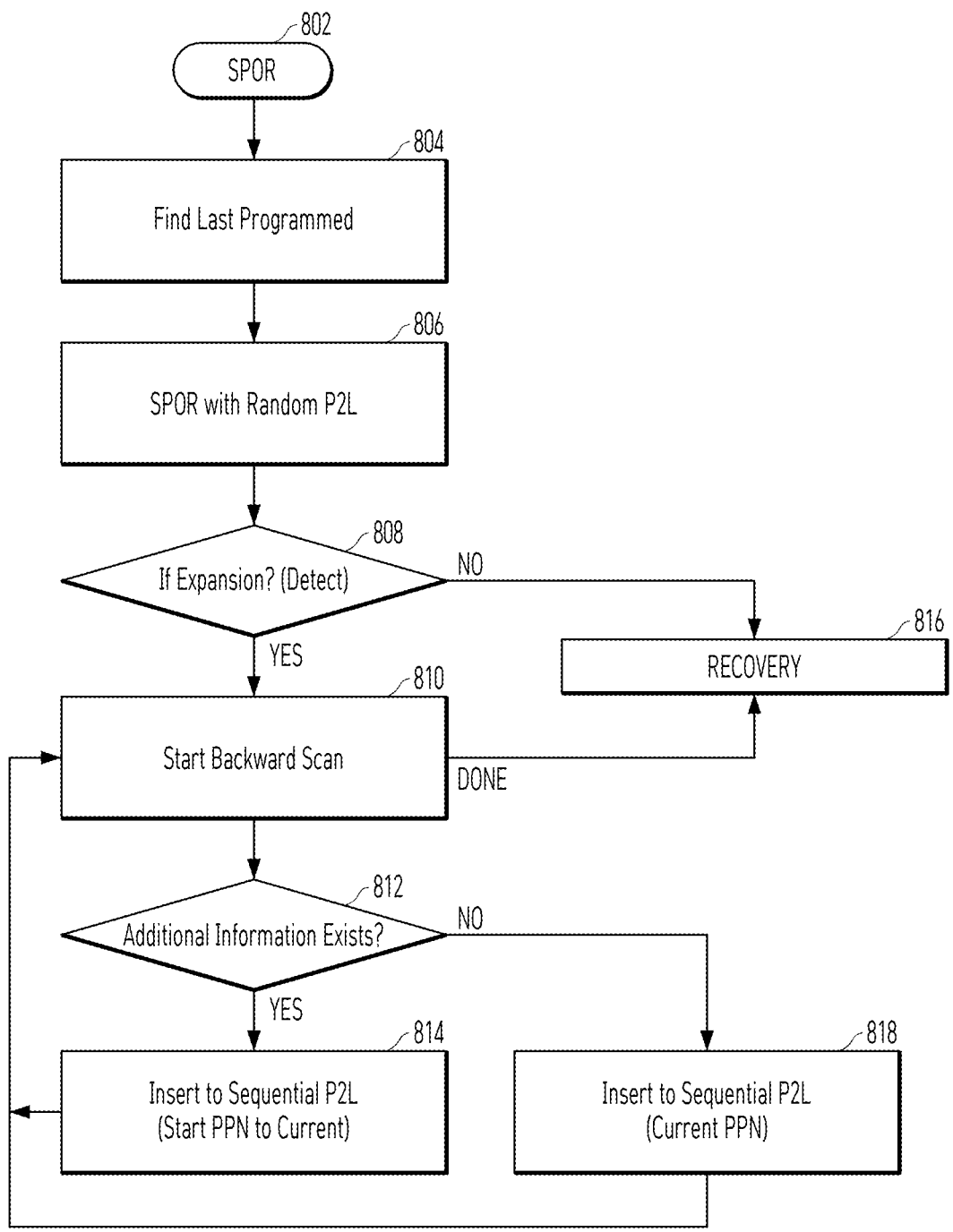
FIG. 6 illustrates a recovery operation performed in the memory system in accordance with another embodiment of the present disclosure.

FIG. 6 illustrates a recovery operation performed in the memory system in accordance with another embodiment of the present disclosure. FIG. 6 illustrates a recovery operation (e.g., a sudden power off recovery (SPOR) operation) when checkpoint information is stored according to an operating method of the memory system described in FIG. 5. The recovery operation (SPOR) can be performed when power is supplied (Power-On) after sudden power-off (SPO) (step 802).

Referring to FIG. 6, the memory system 110 may scan the last stored data in the memory device 150 (step 804). The memory system 110 can determine the last stored data by scanning open memory blocks in the memory device 150 that were used before the sudden power off (SPO).

The memory system 110 performs a recovery operation based on map data (e.g., Random P2L table) for random data entries (step 806). Typically, sequential data entries that the memory system 110 stores in the memory device 150 outnumber random data entries stored therein. Since each random data entry is not continuously connected to each other, each random data entry may be restored based on the map data (e.g., P2L table) for the random data entries.

The memory system 110 may then check, using checkpoint information stored in the memory device 150, whether the operational data is expanded (step 808). Referring to FIG. 5, if the expansion of the operational data is not expanded (FALSE) (NO in step 808), the memory system 110 does not have to restore map data (e.g., P2L table) for data entries stored in the memory device 150 (step 816). The memory system 110 can check the map data (e.g., P2L table) secured through the checkpoint information CP1 and CP2 and the journaling data (e.g., Journaling (Log) Data), and perform a restoration operation based on the corresponding map data (e.g., P2L table) (816 step).

When the operational data is indicated as being expanded (TRUE), it is necessary for the memory system 110 to restore the map data (e.g., P2L table) for the data entries stored in the memory device 150. First, the memory system 110 can check whether there is additional information in the map data (e.g., P2L) obtained through the checkpoint information CP1 and CP2 and the journaling data (e.g., Journaling (Log) Data) (step 812). At this time, based on the additional information included in the map data (e.g., P2L), the memory system 110 can check whether the data entry corresponding to a mapping entry included in the map data is a sequential data entry or a random data entry during the recovery operation.

For example, if the map data includes the additional information (YES in step 812), the memory system 110 can recognize that the data entry corresponding to the map data (e.g., Sequential P2L table) for the sequential data entries is a sequential data entry (step 814). If there is no additional information included in the map data (NO in step 812), the memory system 110 can recognize that the data entry corresponding to the map data (e.g., P2L table) for the sequential data entries is a random data entry (step 818).

Afterwards, the memory system 110 can check whether there is another additional information in the map data (e.g., Sequential P2L table) for the sequential data entries (step 810). When a scan for additional information in the map data (e.g., Sequential P2L table) for the sequential data entries is completed (DONE in step 810), the memory system 110 can perform a recovery operation based on the updated map data (e.g., Sequential P2L table) for the sequential data entries (step 816).

Referring to FIGS. 5 and 6, the memory system 110 may continue to perform write operations while delaying a checkpoint operation or a map data update operation in response to a state of the buffer set for storing operational data even when a pattern of write data entries is changed. The state of the buffer set for storing the operational data may be determined based on a plurality of preset reference values corresponding to the performance of the memory system 110. Specially, a size of map data that can be used in a sudden power off recovery (SPOR) operation performed when power is supplied (Power-On) after sudden power off (SPO) can be considered before the sudden power off (SPO), so that the memory system 110 avoids a buffer overflow or overrun that might occur in the recovery operation later performed. Further, by storing additional information in the map data regarding changes in a pattern of write data, it is possible for the memory system 110 to more easily check whether the data entry stored in an open memory block is a sequential data entry or a random data entry during the recovery operation.

Figure 7:
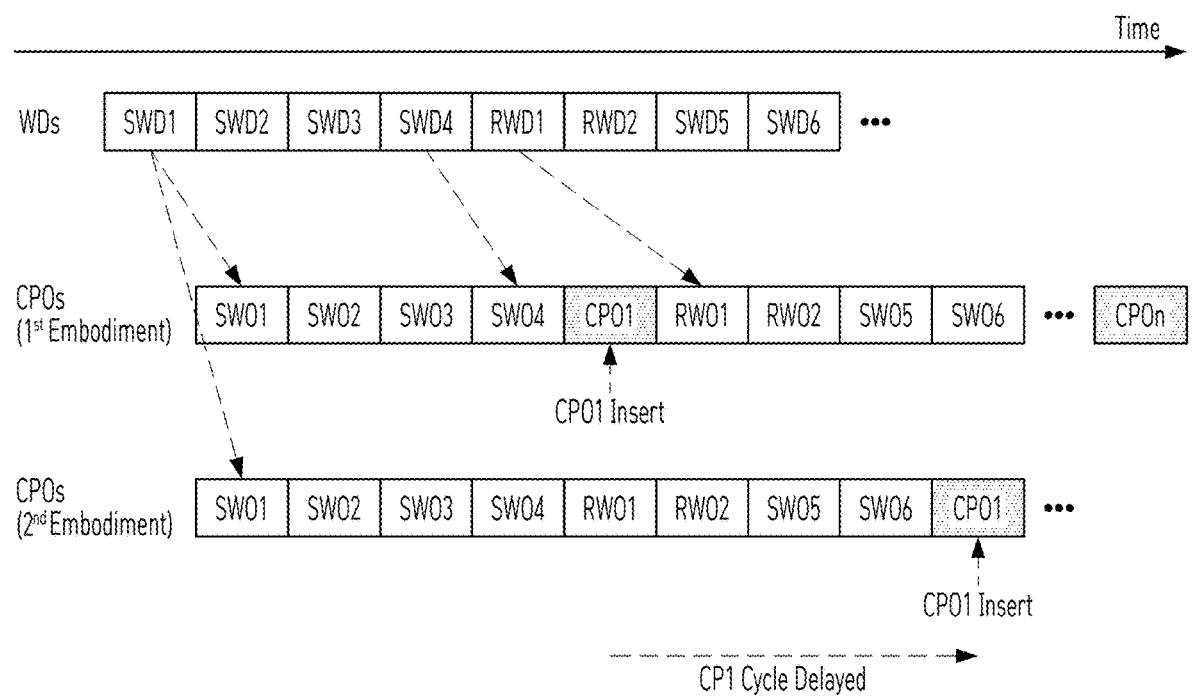
FIG. 7 illustrates operation of memory systems in accordance with embodiments of the present disclosure.

FIG. 7 illustrates operation of memory systems in accordance with embodiments of the present disclosure.

Referring to FIGS. 1 to 7, the memory system 110 can perform a checkpoint operation according to a first operation method based on a change in the pattern of write data entries (e.g., first embodiment). a second operation method corresponding to the state of the buffer (e.g., second embodiment). or a combination thereof.

A plurality of write data entries WDs may be transmitted to the memory system 110. The plurality of write data entries (WDs) may include sequential data entries SWD1, SWD2, SWD3, SWD4, SWD5, and SWD6 and random data entries RWD1 and RWD2. The memory system 110 may sequentially perform a plurality of program operations to store the plurality of write data entries WDs in the memory device 150.

Referring to the first embodiment, the memory system 110 can perform a plurality of program operations SWO1, SWO2, SWO3, and SWO4, respectively corresponding to the sequential data entries SWD1, SWD2, SWD3, SWD4. When the first random data entry RWD1 is delivered after the fourth sequential data entry SWD4, the memory system 110 may recognize that a pattern of the write data entries has changed. In response to the change in the pattern of the write data entries, the memory system 110 can perform a first checkpoint operation CPO1 before performing a program operation RWO1 corresponding to the first random data entry RWD1. After performing the first checkpoint operation CPO1, the memory system 110 can perform the program operation RWO1 corresponding to the first random data entry RWD1.

Referring to the second embodiment, the memory system 110 can delay the first check point operation CPO1 under a same condition. That is, the first checkpoint cycle (CP1 Cycle) in which the first check point operation CPO1 is performed may be delayed. The memory system 110 may perform the plurality of program operations SWO1, SWO2, SWO3, and SWO4 respectively corresponding to the sequential data entries SWD1, SWD2, SWD3, and SWD4. When the first random data entry RWD1 is delivered after the fourth sequential data entry SWD4, the memory system 110 can recognize that the pattern of the write data entries has changed. However, the memory system 110 may determine whether operational data regarding the first random data RWD1 falls within a range that can be stored in a buffer within the memory 144. If it is determined that the operational data regarding the first random data entry RWD1 falls within the range, the memory system 110 may perform a program operation RWO1 corresponding to the first random data entry RWD1 and delay the first checkpoint operation CPO1.

In the second embodiment, the memory system 110 can delay the first check point operation CPO1 despite twice detecting changes in the pattern of write data entries. Even if a first pattern change occurs between the fourth sequential data entry SWD4 and the first random data entry RWD1 and a second pattern change between the second random data entry RWD2 and the fifth sequential data entry SWD5, operational data regarding the plurality of write data entries including the sequential data entries SWD1, SWD2, SWD3, SWD4, SWD5, and SWD6 and the random data entries RWD1 and RWD2 can be stored in the buffer within the memory 144, so that the memory system 110 may continue to perform a program operation SWO6 corresponding to the sixth sequential data entry SWD6. After performing the program operation SWO6, the memory system 110 may perform the first check point operation CPO1.

Comparing the first embodiment and the second embodiment, improvement in data input/output performance of the memory system 110 could be expected at least to the extent that the first check point cycle (CP1 Cycle) in which the first check point operation CPO1 is performed is delayed. For example, the memory system 110 may delay a timing for performing the checkpoint operation, thereby reducing the number of times checkpoint operations are performed.

Figure 8:
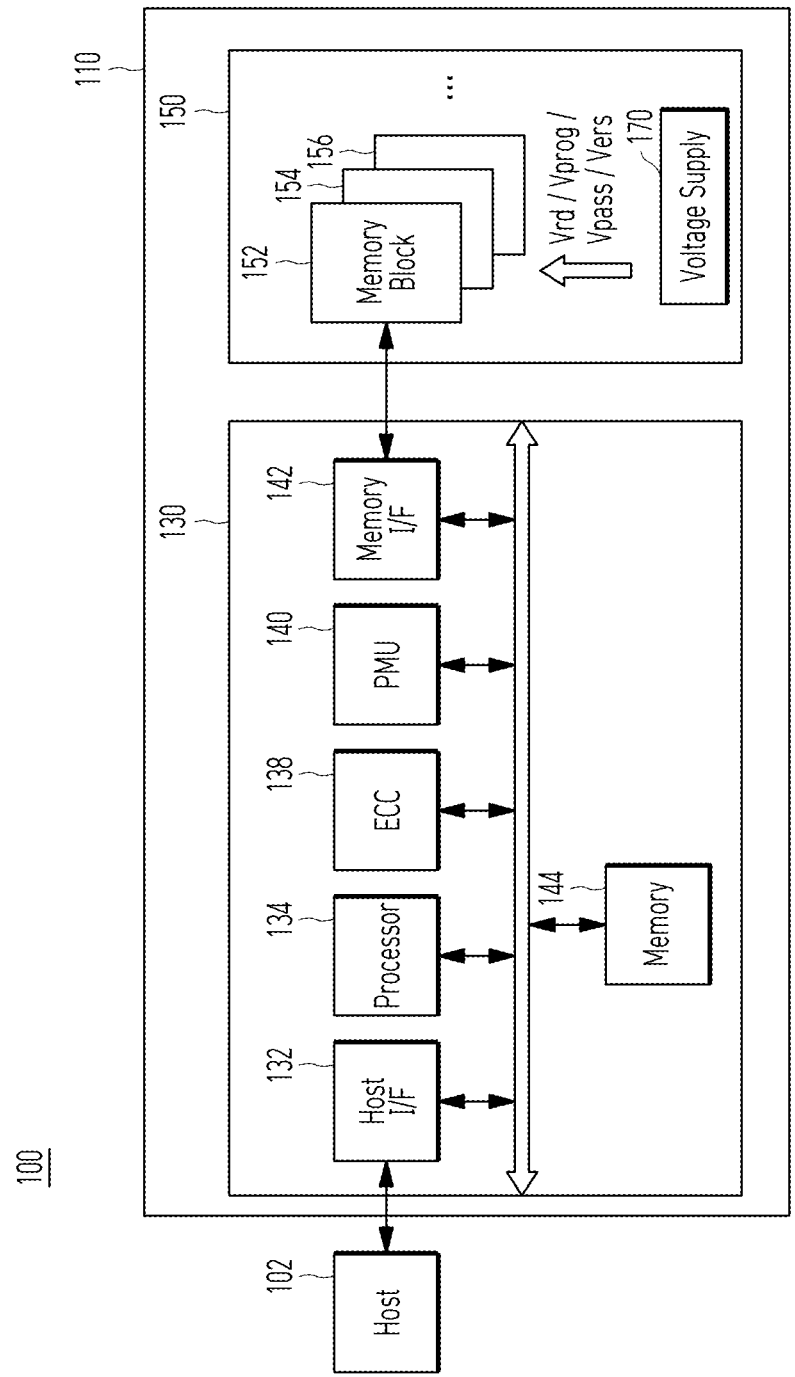
FIG. 8 illustrates a data processing system in accordance with another embodiment of the present disclosure.

FIG. 8 illustrates a data processing system according to an embodiment of the present disclosure.

Referring to FIG. 8, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips.

The controller 130 may perform a data input/output operation (such as a read operation, a program operation, an erase operation, or etc.) in response to a request or a command input from an external device such as the host 102. For example, when the controller 130 performs a read operation in response to a read request input from an external device, data stored in a plurality of non-volatile memory cells included in the memory device 150 is transmitted to the controller 130. Further, the controller 130 can independently perform an operation regardless of the request or the command input from the host 102. Regarding an operation state of the memory device 150, the controller 130 can perform an operation such as garbage collection (GC), wear leveling (WL), a bad block management (BBM) for checking whether a memory block is bad and handing a bad block.

The memory device 150 may include a plurality of memory blocks 152, 154, 156. The memory blocks 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block 152, 154, 156 may include a plurality of pages. The memory device 150 may include a voltage supply circuit 170 capable of supplying at least one voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block 152, 154, 156.

The host 102 interworking with the memory system 110, or the data processing system 110 including the memory system 110 and the host 102, is a mobility electronic device (such as a vehicle), an portable electronic device (such as a mobile phone, an MP3 player, a laptop computer, or the like), and a non-portable electronic device (such as a desktop computer, a game machine, a TV, a projector, or the like). The host 102 may provide interaction between the host 102 and a user using the data processing system 100 or the memory system 110 through at least one operating system (OS). The host 102 transmits a plurality of commands corresponding to user's request to the memory system 110, and the memory system 110 performs data input/output operations corresponding to the plurality of commands (e.g., operations corresponding to the user's request).

The memory system 110 may be implemented with any of various types of storage devices. Non-limiting examples of storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. According to an embodiment, the controller 130 may include a host interface 132, a processor 134, a power management unit (PMU) 140, a memory interface 142, and a memory 144. Components may be added to or omitted from the controller 130 according to structures, functions, operation performance, or the like, regarding the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus or a circuit capable of transmitting signals, data, and the like to the host 102 or receiving signals, data, and the like from the host 102. According to an embodiment, the host interface 132 is a type of layer for exchanging data with the host 102 and is implemented with, or driven by, firmware called a host interface layer (HIL). According to an embodiment, the host interface 132 can include a command queue.

The host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 102 and the memory system 110 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

The memory system 110 may support the Non-volatile memory express (NVMe). The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component (such as Auxiliary Power Supply) capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. In a case when the memory device 150 includes a NAND flash memory, the memory interface 142 includes a NAND flash controller (NFC). According to an embodiment, the memory interface 142 can be implemented through, or driven by, firmware called a Flash Interface Layer (FIL) for exchanging data with the memory device 150. Further, according to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data for operations performed in the memory system 110 and the controller 130. According to an embodiment, the memory 144 may be implemented with a volatile memory. For example, the memory 144 may be implemented with a static random access memory (SRAM), a dynamic random access memory (DRAM), or both. The memory 144 can be disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIG. 9. According to an embodiment, the processor 134 may be implemented with a microprocessor, a central processing unit (CPU), or the like. According to an embodiment, the memory system 110 may be implemented with at least one multi-core processor, co-processors, or the like.

The plurality of memory blocks 152, 154, 156 included in the memory device 150 may be classified according to the number of bits that can be stored in, or expressed by, each memory cell. A memory block included in the memory device 150 may include a single level cell (SLC) memory block, a double level cell (DLC), a triple level cell (TLC), and a quadruple level cell (QLC), or a multiple level cell including a plurality of pages implemented by memory cells, each capable of storing 5 bits or more bits of data in one memory cell.

According to an embodiment, the controller 130 may use an MLC memory block included in the memory device 150 as an SLC memory block that stores one-bit data in each memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. The controller 130 may use the MLC memory block as a SLC buffer to temporarily store data because the SLC buffer for write data, or a write booster buffer, can provide a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in a MLC. According to an embodiment, an operation for uniformly levelling threshold voltages of the MLCs may be carried out before another 1-bit data is programmed in the same MLCs, each having stored 1-bit data.

According to an embodiment, the memory device 150 is embodied as a non-volatile memory such as a flash memory, for example, a Read Only Memory (ROM), a Mask ROM (MROM), a Programmable ROM (PROM), an Erasable ROM (EPROM), an Electrically Erasable ROM (EEPROM), a Magnetic (MRAM), a NAND flash memory, a NOR flash memory, or the like. In another embodiment, the memory device 150 may be implemented by at least one of a phase change random access memory (PCRAM), a Resistive Random Access Memory (ReRAM), a ferroelectrics random access memory (FRAM), a transfer torque random access memory (STT-RAM), and a spin transfer torque magnetic random access memory (STT-MRAM), or the like.

Figure 9:
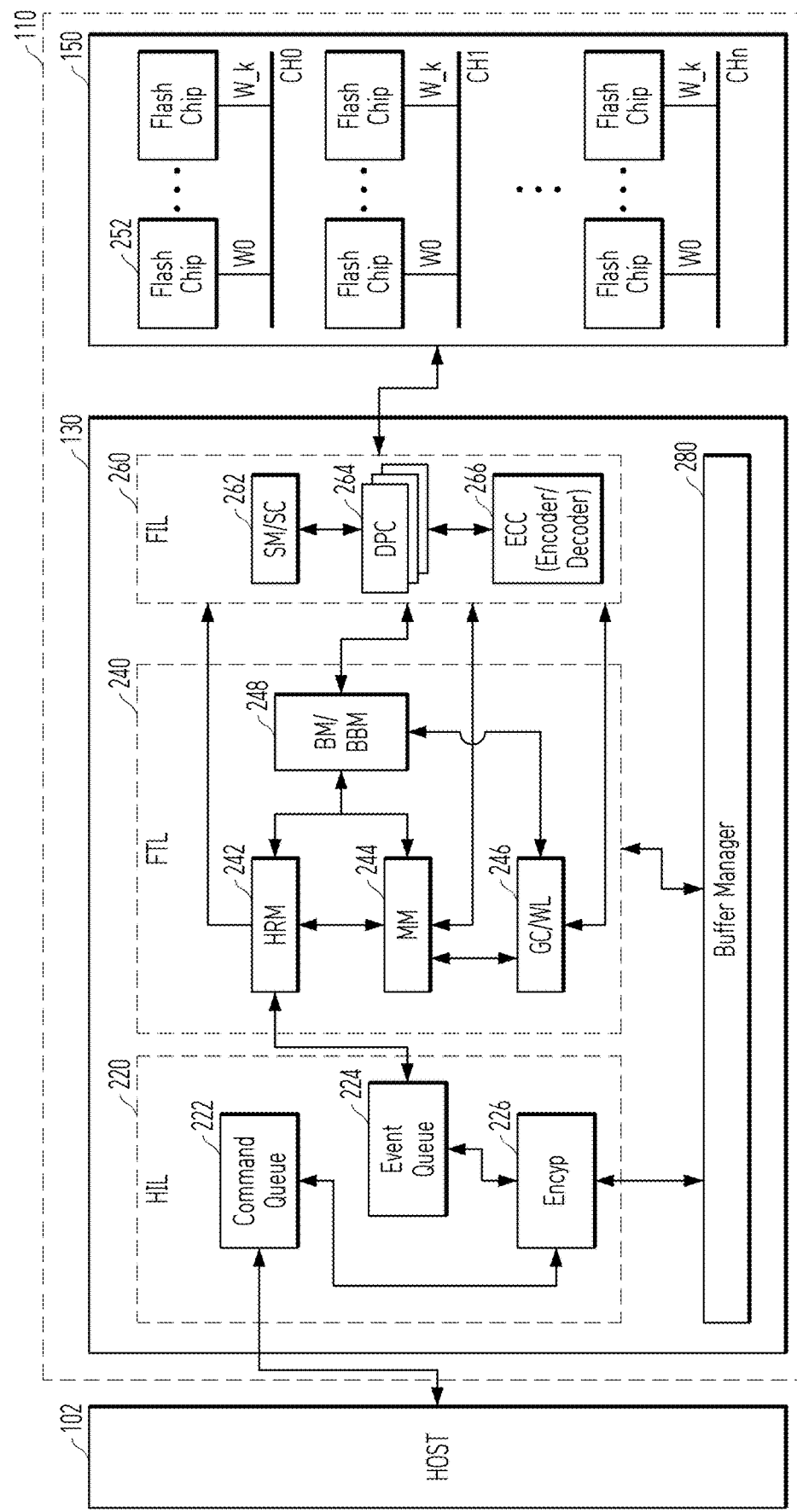
FIG. 9 illustrates a memory system in accordance with another embodiment of the present disclosure.

FIG. 9 illustrates a memory system according to an embodiment of the present disclosure.

Referring to FIG. 9, the controller 130 in a memory system operates along with the host 102 and the memory device 150. As illustrated, the controller 130 may have a layered structure including the host interface (HIL) 220, a flash translation layer (FTL) 240, the memory interface (flash interface layer, FIL) 260.

The memory device 150 can include a plurality of memory chips 252 coupled to the controller 130 through a plurality of channels CH0, CH1, . . . , CH1_n and ways W0, . . . , W_k. The memory chip 252 can include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells. Each memory plane or each memory die can support an interleaving mode in which a plurality of data input/output operations are performed in parallel or simultaneously. According to an embodiment, memory blocks included in each memory plane, or each memory die, included in the memory device 150 can be grouped to input/output a plurality of data entries as a super memory block.

An internal configuration of the memory device 150 shown in FIGS. 8 and 9 may be changed based on operating performance of the memory system 110. An embodiment of the present disclosure may not be limited to the internal configuration described in FIGS. 8 and 9.

The host interface layer (HIL) 220, the flash translation layer (FTL) 240, and the memory interface layer (FIL) 260 described in FIG. 9 are illustrated as one embodiment. The host interface layer (HIL) 220, the flash translation layer (FTL) 240, and the memory interface layer (FIL) 260 may be implemented in various forms according to the operating performance of the memory system 110. According to an embodiment, the host interface layer 220 may be included in the host interface 132 illustrated in FIG. 8, and the memory interface layer 260 may be included in the memory interface 142 illustrated in FIG. 8.

A buffer manager 280 in the controller 130 can control the input/output of data or operation information in conjunction with the host interface layer (HIL) 220, the flash conversion layer (FTL) 240, and the memory interface layer (FIL) 142. To this end, the buffer manager 280 can set or establish various buffers, caches, or queues in the memory 144 described in FIG. 8, and control data input/output of the buffers, the caches, or the queues, or data transmission between the buffers, the caches, or the queues in response to a request or a command generated by the host interface layer (HIL) 220, the flash translation layer (FTL) 240, and the memory interface layer (FIL) 142. For example, the controller 130 may temporarily store read data provided from the memory device 150 in response to a request from the host 102 before providing the read data to the host 102. Also, the controller 130 may temporarily store write data provided from the host 102 in the memory 144 before storing the write data in the memory device 150. When controlling operations such as a read operation, a program operation, and an erase operation performed within the memory device 150, the read data or the write data transmitted or generated between the controller 130 and the memory device 150 in the memory system 110 could be stored and managed in a buffer, a queue, etc. established in the memory 144 by the buffer manager 280. Besides the read data or the write data, the buffer manager 280 can store signal or information (e.g., map data, a read command, a program command, or etc. which is used for performing operations such as programming and reading data between the host 102 and the memory device 150) in the buffer, the cache, the queue, etc. established in the memory 144. The buffer manager 280 can set, or manage, a command queue, a program memory, a data memory, a write buffer/cache, a read buffer/cache, a data buffer/cache, a map buffer/cache, and etc.

The host interface layer (HIL) 220 may handle commands, data, and the like transmitted from the host 102. By way of example but not limitation, the host interface layer 220 may include a command queue manager 222 and an event queue manager 224. The command queue manager 222 may sequentially store the commands, the data, and the like received from the host 102 in a command queue, and output them to the event queue manager 224, for example, in an order in which they are stored in the command queue manager 222. The event queue manager 224 may sequentially transmit events for processing the commands, the data, and the like received from the command queue. According to an embodiment, the event queue manager 224 may classify, manage, or adjust the commands, the data, and the like received from the command queue. Further, according to an embodiment, the host interface layer 220 can include an encryption manager 226 configured to encrypt a response or output data to be transmitted to the host 102 or to decrypt an encrypted portion in the command or data transmitted from the host 102.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or commands for reading data, i.e., a read command, and a command for programming/writing data, i.e., a write command, may be alternately transmitted to the memory system 110. The command queue manager 222 of the host interface layer 220 may sequentially store commands, data, and the like, which are transmitted from the host 102, in the command queue. Thereafter, the host interface layer 220 may estimate or predict what type of internal operations the controller 130 will perform according to the characteristics of the commands, the data, and the like, which have been transmitted from the host 102. The host interface layer 220 may determine a processing order and a priority of commands, data and the like based on their characteristics. According to the characteristics of the commands, the data, and the like transmitted from the host 102, the event queue manager 224 in the host interface layer 220 is configured to receive an event, which should be processed or handled internally within the memory system 110 or the controller 130 according to the commands, the data, and the like input from the host 102, from the buffer manager 280. Then, the event queue manager 224 can transfer the event including the commands, the data, and the like into the flash translation layer (FTL) 240.

According to an embodiment, the flash translation layer (FTL) 240 may include a host request manager (HRM) 242, a map manager (MM) 244, a state manager 246, and a block manager 248. Further, according to an embodiment, the flash translation layer (FTL) 240 may implement a multi-thread scheme to perform data input/output (I/O) operations. A multi-thread FTL may be implemented through a multi-core processor using multi-thread included in the controller 130. For example, the host request manager (HRM) 242 may manage the events transmitted from the event queue. The map manager (MM) 244 may handle or control map data. The state manager 246 may perform an operation such as garbage collection (GC) or wear leveling (WL), after checking an operation state of the memory device 150. The block manager 248 may execute commands or instructions onto a block in the memory device 150.

The host request manager (HRM) 242 may use the map manager (MM) 244 and the block manager 248 to handle or process requests according to read and program commands and events which are delivered from the host interface layer 220. The host request manager (HRM) 242 may send an inquiry request to the map manager (MM) 244 to determine a physical address corresponding to a logical address which is entered with the events. The host request manager (HRM) 242 may send a read request with the physical address to the memory interface layer 260 to process the read request, i.e., handle the events. In one embodiment, the host request manager (HRM) 242 may send a program request (or a write request) to the block manager 248 to program data to a specific empty page storing no data in the memory device 150, and then may transmit a map update request corresponding to the program request to the map manager (MM) 244 in order to update an item relevant to the programmed data in information of mapping the logical and physical addresses to each other.

The block manager 248 may convert a program request delivered from the host request manager (HRM) 242, the map manager (MM) 244, and/or the state manager 246 into a flash program request used for the memory device 150, in order to manage flash blocks in the memory device 150. In order to maximize or enhance program or write performance of the memory system 110, the block manager 248 may collect program requests and send flash program requests for multiple-plane and one-shot program operations to the memory interface layer 260. In an embodiment, the block manager 248 sends several flash program requests to the memory interface layer 260 to enhance or maximize parallel processing of a multi-channel and multi-directional flash controller.

In an embodiment, the block manager 248 may manage blocks in the memory device 150 according to the number of valid pages, select and erase blocks having no valid pages when a free block is needed, and select a block including the least number of valid pages when it is determined that garbage collection is to be performed. The state manager 246 may perform garbage collection to move valid data stored in the selected block to an empty block and erase data stored in the selected block so that the memory device 150 may have enough free blocks (i.e., empty blocks with no data).

When the block manager 248 provides information regarding a block to be erased to the state manager 246, the state manager 246 may check all flash pages of the block to be erased to determine whether each page of the block is valid. For example, to determine validity of each page, the state manager 246 may identify a logical address recorded in an out-of-band (OOB) area of each page. To determine whether each page is valid, the state manager 246 may compare a physical address of the page with a physical address mapped to a logical address obtained from an inquiry request. The state manager 246 sends a program request to the block manager 248 for each valid page. A map table may be updated by the map manager 244 when a program operation is complete.

The map manager 244 may manage map data, e.g., a logical-physical map table. The map manager 244 may process various requests, for example, queries, updates, and the like, which are generated by the host request manager (HRM) 242 or the state manager 246. The map manager 244 may store the entire map table in the memory device 150, e.g., a flash/non-volatile memory, and cache mapping entries according to the storage capacity of the memory 144. When a map cache miss occurs while processing inquiry or update requests, the map manager 244 may send a read request to the memory interface layer 260 to load a relevant map table stored in the memory device 150. When the number of dirty cache blocks in the map manager 244 exceeds a certain threshold value, a program request may be sent to the block manager 246, so that a clean cache block is made and a dirty map table may be stored in the memory device 150.

When garbage collection is performed, the state manager 246 copies valid page(s) into a free block, and the host request manager (HRM) 242 may program the latest version of the data for the same logical address of the page and concurrently issue an update request. When the state manager 246 requests the map update in a state in which the copying of the valid page(s) is not completed normally, the map manager 244 may not perform the map table update. This is because the map request is issued with old physical information when the state manger 246 requests a map update and a valid page copy is completed later. The map manager 244 may perform a map update operation to ensure accuracy when, or only if, the latest map table still points to the old physical address.

The memory interface layer 260 may exchange data, commands, state information, and the like, with a plurality of memory chips 252 in the memory device 150 through a data communication method. According to an embodiment, the memory interface layer 260 may include a status check schedule manager 262 and a data path manager 264. The status check schedule manager 262 can check and determine the operation state regarding the plurality of memory chips 252 coupled to the controller 130, the operation state regarding a plurality of channels CH0, CH1, . . . , CH1_n and the plurality of ways W0, . . . , W_k, and the like. The transmission and reception of data or commands can be scheduled in response to the operation states regarding the plurality of memory chips 252 and the plurality of channels CH0, CH1, . . . , CH1_n. The data path manager 264 can control the transmission and reception of data, commands, etc. through the plurality of channels CH0, CH1, . . . , CH1_n and ways W0, . . . , W_k based on the information transmitted from the status check schedule manager 262. According to an embodiment, the data path manager 264 may include a plurality of transceivers, each transceiver corresponding to each of the plurality of channels CH0, CH1, . . . , CH1_n.

According to an embodiment, the memory interface layer 260 may further include ECC (error correction code) module 266 configured to perform error checking and correction of data transferred between the controller 130 and the memory device 150. The ECC unit 266 may be implemented as a separate module, circuit, or firmware in the controller 130, but may also be implemented in each memory chip 252 included in the memory device 150 according to an embodiment. The ECC module 266 may include a program, a circuit, a module, a system, or an apparatus for detecting and correcting an error bit of data processed by the memory device 150.

For finding and correcting any error of data transferred from the memory device 150, the ECC module 266 can include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the ECC module 266 can determine whether the error correction decoding has succeeded or not, and outputs an instruction signal, e.g., a correction success signal or a correction fail signal, based on a result of the error correction decoding. The ECC module 266 may use a parity bit, which has been generated during the ECC encoding process for the data stored in the memory device 150, in order to correct the error bits of the read data entries. When the number of the error bits is greater than or equal to the number of correctable error bits, the ECC circuitry 138 may not correct the error bits and instead may output the correction fail signal indicating failure in correcting the error bits.

According to an embodiment, the ECC circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The ECC circuitry 138 may include all circuits, modules, systems, and/or devices for performing the error correction operation based on at least one of the above-described codes.

In accordance with an embodiment, a manager included in the host interface layer 220, the flash translation layer (FTL) 240, and the memory interface layer 260 could be implemented with a general processor, an accelerator, a dedicated processor, a co-processor, a multi-core processor, or the like. According to an embodiment, the manager can be implemented with firmware working with a processor.

As above described, a memory device or a memory system according to an embodiment of the present disclosure can prevent data input/output performance from being deteriorated due to frequent map data updates or checkpoint operations.

Further, a memory device or a memory system according to an embodiment of the present disclosure can continuously perform a program operation for a plurality of write data entries without updating map data or performing a checkpoint operation even if sequential data entries and a random data entry are mixed in the plurality of write data entries, so that a speed of data input/output operations in the memory device or the memory system may be improved.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the scope of the invention as defined by the following claims. Furthermore, the disclosed embodiments may be combined to form additional embodiments.

What is claimed is:

1. A memory system, comprising:
a memory device comprising a plurality of memory blocks; and
a controller configured to recognize that a change in a pattern of a plurality of write data entries, delay a checkpoint operation associated with a write operation regarding the plurality of write data entries when a size of operational data regarding the plurality of write data entries is within a range that is capable of being stored in a buffer, and perform the checkpoint operation when the size of the operational data is beyond the range.

2. The memory system according to claim 1, wherein the checkpoint operation comprises an operation for adding, into log data, operational data regarding the plurality of write data entries which have been stored in the memory device.

3. The memory system according to claim 2, wherein the change in the pattern is a change from sequential data entries to a random data entry.

4. The memory system according to claim 3, wherein the operational data comprises information regarding a logical address and a physical address associated with the random data entry.

5. The memory system according to claim 3, wherein the operational data comprises count information on how many of the sequential data entries have been stored in the memory device.

6. The memory system according to claim 1, wherein the range is determined based on a size of a recovery buffer established for a recovery operation performed after a sudden power off (SPO), a size of map data regarding sequential data entries present before the sudden power off, and a size of map data used for the recovery operation.

7. The memory system according to claim 1, wherein a first number of maximum sequential data entries and a second number of maximum random data entries, which are programmed in the memory device during continuous write operations, are determined based on a size of the buffer, and
wherein the first number is greater than the second number.

8. The memory system according to claim 1, wherein the controller is further configured to:
store checkpoint information in log data through the checkpoint operation; and
restore the plurality of write data entries based on the checkpoint information when power is supplied after a sudden power off (SPO).

9. The memory system according to claim 8, wherein the controller is configured to add, after the power is supplied, operational data corresponding to a random data entry to map data of sequential data entries when it is recognized through the checkpoint information that the change in the pattern had occurred.

10. The memory system according to claim 9, wherein the controller is configured to record the random data entry as a first entry of new sequential data entries in a spare region of the map data, based on the operational data corresponding to the random data entry.

11. The memory system according to claim 8, wherein the controller is configured to skip data scan for an open memory block based on count information regarding sequential data entries, which is included in the checkpoint information.

12. A method for operating a memory system, comprising:
recognizing a change in a pattern of a plurality of write data entries input from an external device and programmed in a memory device comprising a plurality of memory blocks;
determining whether a size of operational data regarding the plurality of write data entries is within a range that is capable of being stored in a buffer;

delaying a checkpoint operation associated with a write operation regarding the plurality of write data entries when the size of the operational data is within the range; and performing the checkpoint operation when the size of the operational data is beyond the range.

13. The method according to claim 12, wherein the checkpoint operation comprises an operation for adding, into log data, operational data regarding at least one write entry, which has been stored in the memory device, among the plurality of write data entries.

14. The method according to claim 12, wherein the change in the pattern is from sequential data entries to a random data entry.

15. The method according to claim 14, the operational data comprises information regarding a logical address and a physical address associated with the random data entry and count information on how many of the sequential data entries have been stored in the memory device.

16. The method according to claim 12, wherein the range is determined based on a size of a recovery buffer established for a recovery operation performed after a sudden power off (SPO), a size of map data regarding sequential data entries present before the sudden power off, and a size of map data used for the recovery operation, and wherein a first number of maximum sequential data entries and a second number of maximum random data entries, which are programmed in the memory device during continuous write operations, are determined based on a size of the buffer, and wherein the first number is greater than the second number.

17. The method according to claim 12, further comprising:

storing checkpoint information in log data through the checkpoint operation; and restoring the plurality of write data entries based on the checkpoint information when power is supplied after a sudden power off (SPO).

18. The method according to claim 17, wherein restoring the plurality of write data entries comprises adding, after the power is supplied, operational data corresponding to a random data entry to map data of sequential data entries when it is recognized through the checkpoint information that the change in the pattern had occurred.

19. The method according to claim 18, wherein adding the operational data comprises recording the random data entry as a first entry of new sequential data entries in a spare region of the map data, based on the operational data corresponding to the random data entry.

20. The method according to claim 19, wherein restoring the plurality of write data entries comprises skipping data scan for an open memory block based on count information regarding sequential data entries, which is included in the checkpoint information.

* * * * *